United States Patent [19]

Lippmann et al.

[11] Patent Number: 4,769,771

[45] Date of Patent: Sep. 6, 1988

[54] MULTIPROCESSOR SYSTEM COMPRISING A PLURALITY OF DATA PROCESSORS WHICH ARE INTERCONNECTED BY A COMMUNICATION NETWORK

[75] Inventors: Wouter J. H. M. Lippmann; Jozef L. W. Kessels; l Huibert H. Eggenhuisen; Hendrik Dijkstra, all of Eindhoven, Netherlands

[73] Assignee: U.S. Philips Corporation, New York, N.Y.

[21] Appl. No.: 691,316

[22] Filed: Jan. 14, 1985

[30] Foreign Application Priority Data

Jan. 20, 1984 [NL] Netherlands ............... 8400186

[51] Int. Cl.⁴ .................................. G06F 15/16
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 3,483,520 | 12/1969 | Broderick et al. | 364/200 |
| 3,715,729 | 2/1973 | Mercy | 364/200 |
| 4,223,380 | 9/1980 | Antonaccio et al. | 364/200 |
| 4,228,496 | 10/1980 | Katzman et al. | 364/200 |
| 4,387,427 | 6/1983 | Cox et al. | 364/200 |
| 4,412,286 | 10/1983 | O'Dowd et al. | 364/200 |
| 4,430,699 | 2/1984 | Segarra et al. | 364/200 |
| 4,445,171 | 4/1984 | Neches | 364/200 |
| 4,493,021 | 1/1985 | Agrawal et al. | 364/200 |
| 4,503,499 | 3/1985 | Mason | 364/200 |
| 4,669,043 | 5/1987 | Kaplinsky | 364/200 |

OTHER PUBLICATIONS

Waumans, Philips Techn. Rev. 40, 1982, No. 819, pp. 262-268.
LAM, "Principles of Communication and Networking Protocols" IEEE, 1984 pp. 14-17 and 40-42.
Automatica, vol. 6, pp. 261-270, 1970, "Two Coordination Principles and Their Application in Large Scale Systems Control".
Bell, "More Power by Networking" IEEE Spectrum, 2/74, pp. 40-45.
Electronics, Nov. 11, 1976, "Satellite Processors Lighten the Burden in Computer-Run Systems" Fisher et al.

Primary Examiner—Gary V. Harkcom
Assistant Examiner—C. H. Lynt
Attorney, Agent, or Firm—James J. Cannon

[57] ABSTRACT

A processor system having one or more stations (22, 24, 26) which are interconnected by a general communication network (20). Each station has one or more processors (34, 36). Superprocesses (74, 76, 78) which have one or more processes (80-90) can be executed in the stations. Each superprocess is provided with mail-box space (50, 52, 54) for communication with the environment, in which mail-box space the relevant superprocess and other superprocesses can write but in which only the relevant superprocess itself can read. Processes within the same superprocess have variable data in common, but their register stacks are private. Each mail-box is provided with a filling indicator. In the case of a read operation in an empty mail-box space, a wait signal is issued for the initiating process; write operations in a full mail-box space produce an error signal. There is also provided a job control system for allocating jobs among the stations by way of an application load file.

6 Claims, 4 Drawing Sheets

MULTIPROCESSOR SYSTEM COMPRISING A PLURALITY OF DATA PROCESSORS WHICH ARE INTERCONNECTED BY A COMMUNICATION NETWORK

BACKGROUND OF THE INVENTION

1. Field of the Invention

The invention relates to a processor system, comprising a plurality of data processors, a communication network interconnecting said data processors so that said data processors can exchange information, a system memory, and a connection to the outer world, said system being such that various processes can be executed in the various processors while implementing a communication mechanism between different processes.

2. Description of the Prior Art

A multiprocessor system of this kind is known from U.S. Pat. No. 4,387,427 in the name of G. W. Cox et al, assigned to INTEL CORPORATION. This system is a rigidly coupled system which comprises a common memory which is shared by all processors and which is designed so that the impression of only a single processor is given to the outer world (be it a processor having a very high processing speed).

In such a set-up, however, the overall size of the system is inherently subject to a very severe upper limit, notably because the maximum number of processors is always limited, for example to less than ten.

The present invention aims to achieve a higher flexibility with several stations which appear to be separate vis-à-vis the environment so that the advantages of less rigidly coupled stations also become apparent. A station is a so-called hardware machine (HAMA), i.e. a locally present collection of parts intended for data processing, including the so-called system software which is intended for the control of these parts and which is an absolute requirement for any data processing operation. Each station comprises at least one processor which belongs to said parts and which serves to execute the various processes. These processors notably relate to the data processing operations which are controlled by "application software" in order to execute the information treatment intended by the user of the processor system. Therefore, it is an object of the invention to provide a processor system in which these application programs can be loaded without it being necessary for the user of the system to take account of the architecture of the stations; this is feasible in that, both with respect to one another and with respect to the environment, the stations can "hide" themselves as it were behind "mail box" spaces, each of which is exclusively associated with one super-process, so that the super-processes also hide themselves as it were from one another and from the environment, behind these mail-box spaces; within one superprocess one or more processes can then be executed which can communicate and cooperate, for example wordwise, without reference to the mail-box mechanism so that user programs can be performed in a uniprocessor system as well as in a multiprocessor system and a system can remain operational in the case of failure of one or more stations, at least in as far as the elements required for an application remain operational in a sufficient amount for the remaining station (stations) or the relevant portion of the processing system to process the application. Elements are to be understood to mean herein apparatuses (for example, peripheral apparatuses) as well as program aids (for example, a conversion program between two data structures). A portion of the system is formed by one station or by a number of stations, provided that this number of stations can communicate among each other.

SUMMARY OF THE INVENTION

The invention provides a processor system, comprising a plurality of data processors, a communication network interconnecting said data processors so that said data processors can exchange information, a system memory, and a connection to the outer world, said system being such that various processes can be executed in the various processors while implementing a communication mechanism between different processes, characterized in that the processor system comprises a set of stations which are all interconnected by a general communication network, each station comprising a set of processors and a memory having an address space which is allocated to the processors of the relevant station collectively and cannot be read by other processors, in order to execute per station a set of superprocesses which is allocated solely to the relevant staion, each superprocess comprising a set of processes which are exclusive thereto, at least one superprocesses comprising at least two processes, all processes of the same superprocess having in common a set of variable information which includes at least the locally operational data and which is accessible in a part of the relevant address space by all processes of the relevant superprocess, each process having its own private memory stack space, the various processes of a superprocess being selectively executable in the processor(s) of the relevant station, each superprocess being provided within said part of the relevant address space with a mail-box space as an exclusive read communication space in order that it can receive information written therein by any superprocess within said set of stations, said mail-box space being the only storage space with which the relevant superprocess is provided which can be written into by another superprocess, each superprocess comprising means for writing block-wise organized information into a selected mail-box space corresponding to any superprocess, each mail-box space being provided with a filling indicator which is arranged to cause a wait signal to be generated when a read operation is undertaken by a superprocess in an empty mail-box space, and an error signal to be generated when a write operation is undertaken by a superprocess in a completely filled mail-box space, but otherwise enable a read operation or a write operation to take place, the processor system also including a job control system for selectively assigning a job, when presented to the processor system, to a set of at least one said station for execution as a set of superprocesses.

The communication network can thus be optimized for block-wise organized transports; the size of a block may now be substantial; in an office system, a block may comprise all pixel information of a page of text and Figures, for example 4 Mbytes. A block may also be shorter, and blocks of mutually different length may also be transported via the communication network in an intermingled manner. The idea behind the foregoing is that different superprocesses can communicate better at the level of a block, while the communication between processes of a single superprocess usually takes place at the level of a memory access, for example on a word basis. The realization of the foregoing is particularly attractive when one or more superprocesses comprise more than one process.

A process is to be understood to mean herein a number of elementary operations which are chained by a sequencer and which are performed on information stored in the memory assigned to the relevant process. The state of a process can thus be indicated by way of a state diagram.

A superprocess is to be understood to mean herein a set of (one or more) processes. When a superprocess comprises several processes, the different stages of the various sequencers need not cohere according to a fixed relationship. The state diagram of a superprocess is composed of the parallel and mutually independent state diagrams of the constituent processes. As has already been stated, the processes of a superprocess have given information in common, notably data information. Other information, notably the (register) stack, is private to each process, while for other information, for example program code, the choice may be different per processor system or even per application.

It is to be noted that herein it is assumed that each set comprises at least one element.

Notably the part of the system software which is referred to as the "operating system" is decentralized. This part notably performs:

job control, which is the dynamic assignment of jobs making up the application program, for execution, to the various stations on the basis of selective activation;

network control, which is the dynamic assignment of the transport facilities of the communication network to the various requesting superprocesses;

file control, which is the dynamic assignment of access to one or more data files to superprocesses requesting such access. A peripheral apparatus, or more accurately an amount of information concerning the operational state of a peripheral apparatus, can also be treated as a file. For example, when the peripheral apparatus is a disc memory, the information stored on the disc can itself also be treated as a file.

The consequences of such decentralization are inter alia that a remaining portion of the system may remain operational when a station fails. (Thus, a portion is a part of the system which does not communicate or which no longer communicates with any further part of the system.) In order to achieve this, given parts of the operating system should be present in several stations or even in all stations. On the other hand, a given task of the operating system which is requested from a given station may be referred to another station. This means that the sub-functions of the operating system need not all be present in all stations. The choice as regards the degree of duplication will be determined by the degree of failure of parts of the system which it is required does not yet lead to a failure of the complete system. For example, the failure of a central filing station comprising a store of selectively addressable, optically readable memory discs will often lead to insurmountable problems, so that such a station will not be duplicated. Facilities which can take over for one another, however, will often be duplicated; these facilities could be, for example, a line printer, a video monitor or a frequently used program module.

Preferably, at least one station comprises a plurality of processors, the architecture of the various processors in each specific station which comprises more than one processor being the same. (Architecture is to be understood to mean herein the set of conventions and properties with which the processor manifests itself to a user, notably the so-called "hardware/software" interface.) If this is the case, no information translation will be required between the processors within a single station. Thus, the processors within a station may be of different types so long as they have similar architecture; for example, processor families are marketed which may differ as regards operating speed, set of instructions and permissible address space, but which are otherwise similar vis-à-vis the environment.

All processors may have a similar architecture and each station may include an input element and an output element for communicating a message via the general communication network in the same information configuration as that used within the various stations. This is because no conversion will then be required for the transport via the network, thus speeding up the response.

As an alternative, if each station involves only a single processor architecture, at least two different processor architectures may be present in the processor system, in which case each station may include an output element for communicating a message via the general communication network in the same information configuration as that used in that-station and an input element for converting, if necessary, a message received into an information configuration which is compatible with a processor of the relevant station. If this is the case, no more than one conversion need be performed for each transport, this conversion being at the receiver.

If the network were to require conversion by the transmitter, more time would be required. If the number of different architectures is, for example, only equal to two, only one conversion program need be stored for each station; this also saves storage space.

Preferably, the job control system is such that the set of stations to which a job is assigned remains the same until termination of the relevant job. Such a static allocation increases the predictability of how the system will operate. It can also increase the speed of operation; for example, if a transport is to take place via a slow connection (which fact is known in advance), the transmitting station may start another job because it is known that the reponse will be delayed by a sufficient period of time. In the case of dynamic allocation, the connection may be very fast or very slow: in that case the transmitting station must remain in the waiting state, which sometimes leads to idleness.

Preferably, each superprocess comprises addressing means for addressing clock means which are included in the processor system in order to indicate absolute time and relative time. The addressing of such a hardware clock enables a variety of time controls to be performed, so that such a processor system can be advantageously used in a variety of process control circumstances.

The invention also relates to a station for use in a processor system of the kind specified comprising several stations, said station comprising at least one processor, connection means for connection to a communication network, storage space for the implementation of mail-box space, and also for storing data and program code information corresponding to any locally assigned superprocess, addressing means for addressing clock means included in the processor system in order to indicate absolute time and relative time, and a program module constituting the local kernel of the general operating system. It has been found that such a station can be an attractive component for the modular extension of the processor system, or for maintaining a current system operational in spite of the disconnection of such a station.

An embodiment of the invention will be described in detail hereinafter, by way of examples, with reference to the accompanying diagrammatic drawings. First the background philosophy will be described. Next, a general description of the system will be given. After that, some aspects of the functional specification will be explained. Subsequently, the network will be discussed. After that, given parts of the "operating system" will be elucidated. Finally, the actual communication mechanism between the superprocesses will be described. In the drawings

THE PHILOSPHY OF THE EMBODIMENT

Some elements of the philosophy of the embodiment will be described hereinafter. The organization of the multiprocessor system is horizontal, which means that there is no specific master station. This offers the advantage that the system is flexible in two senses: stations may be added as well as removed. The latter could occur either when a station becomes inoperative, for example due to a defect, or when a line connection can no longer be used, also because of a defect or because this line is reserved for another station for a prolonged period of time. In that case portions of the system which can no longer be used may exist on both sides of the connection; however, in given circumstances the portions can continue to operate in an unobstructed manner (a sufficient amount of hardware and software elements must have be present in each relevant portion). It is a further advantage of a system without a specific master station that dynamic allocation of the jobs to be performed can be achieved; this means that a job can be performed either by one or by another station, depending on the degree of utilization. However, once the allocation has been made, it remains the same for the duration of the execution of the relevant job. It is a drawback of such a system that the communication requires some additional steps which represent an overhead, because the allocation of the job usually requires an interrogation procedure between the various stations in order to find the free facilities. Once the allocation has been performed, the stations can usually operate independently so that the operating speed is higher. The design is aimed at a short response time, which is slightly at the expense of the data throughput speed which can be achieved; the memory space required is also slightly larger; it is required that given software modules can be present more than once, so that the memory costs are higher. These possible drawbacks can be fully acceptable when the line connections, for example because of their comparatively low price, do not become a restrictive factor for the entire system (the relevant system is thus notably suitable for use in a geographically limited area) and also because the additional memory costs need only be moderate.

A central element of the system is formed by the socalled superprocesses which have been defined hereinbefore. These superprocesses can communicate by way of so-called mail-boxes. The advantage of the use of these superprocesses is that their structure can be independent of the hardware used. The use of several processes per superprocess has been found to be advantageous for many parallel-executed processes, for example for the processing of graphic images where different operations are successively performed on each of a sequence of images. In that case each operation represents a single process, all processes together being organized to form a superprocess.

Furthermore, the information configurations of data messages are not converted unless strictly necessary. This means that no conversion whatsoever takes place in the transmitting station, regardless of the nature of the receiving station, for example as represented in the architecture of the latter. No conversion takes place in the receiving station either, if the transmitting station and the receiving station are compatible, for example when they are of the same type or of different types of the same product series. It is only when the stations are not compatible, for example when they have different architectures, that conversion takes place in the receiving station. This offers the advantage that the message is converted once at the most when it is transported between two stations, as opposed to a system where conversion and reconversion always takes place between the conventions applicable to a given station and other conventions which are only applicable to the connection network. The present system is attractive notably when there are only a few types of station: in the case of n stations of p different types, n(p−1) conversion programs are required in the relevant stations altogether. For comparison, in a system having its own network convention there are 2n conversion programs whatever the value of p. For p=1 or 2 the present system is therefore distinctly advantageous. Moreover, this approach has a speed-increasing effect because each conversion consumes time. In any case, the user does not notice the architecture of the station executing his instructions. It may be a drawback that the formatting of the information to be transported may not be optimum for transport, so that it uses more of the transport capacity of the line; for the environment concerned, however, this is usually acceptable.

GENERAL DESCRIPTION OF A PREFERRED EMBODIMENT

Figure 1:
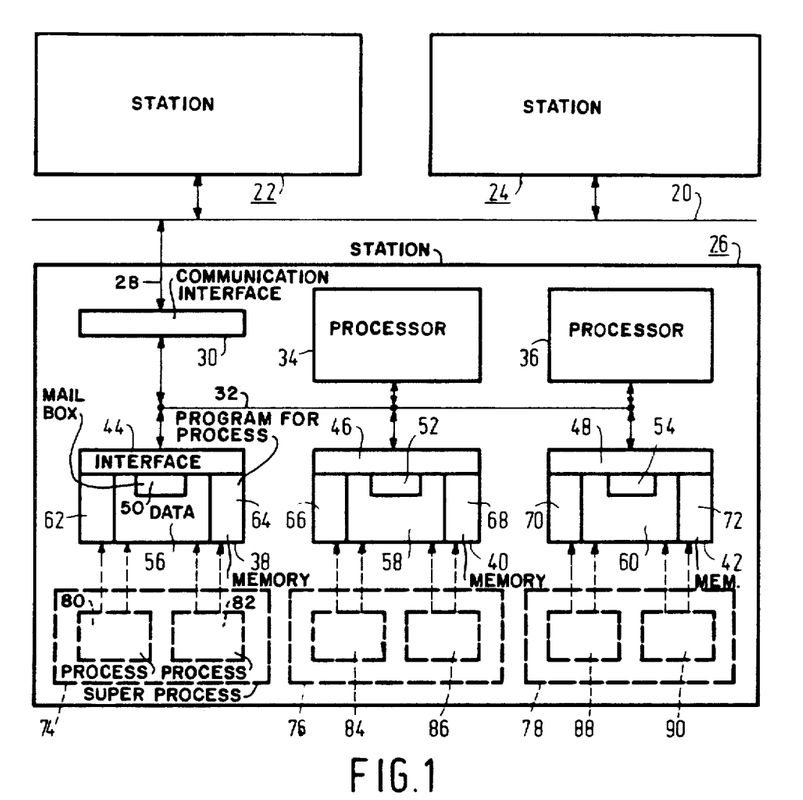
FIG. 1 is a general block diagram of a multiprocessor system.

FIG. 1 is a general block diagram of a preferred embodiment of the invention. In the multiprocessor system shown in FIG. 1 there are three stations, 22, 24, 26, which are interconnected by a general communication network 20 which is formed by a bus in the present embodiment. Only the station 26 is shown in detail. In this case the station is formed by a biprocessor system comprising processors 34 and 36. The station furthermore comprises an amount of information storage space which is represented diagrammatically in the form of three blocks 38, 40 and 42, and an interface circuit 30 to the communication network 20. The elements 30, 34, 36, 38, 40 and 42 are interconnected by a station communication network 32 which is in this case formed by an internal bus. The use of busses is not essential; the general communication network may, for example, alternatively consist of a number of station-to-station connections; in that case some stations or all stations will be connected to more than one connection of this kind. The latter may also occur in the case of a communication network which is based on a bus system: there may then be several busses which are possibly included in a hierarchic structure. The physical realization of the communication network may be conventional. The physical realization of the station bus may also be conventional; it may, for example, be of a type comprising parallel address, data and control lines. The interface circuit 30 will then be formed, for example, by a buffer in order to achieve word-wise buffering with respect to the bus 20 for improved synchronization. The memory block 38 is assigned to a superprocess 74 which comprises two processes 80, 82. Such a (super)process at any given time consists of an amount of information which is stored in the assigned amount of memory space; given memory locations then have specific functions. In order to symbolize this aspect, the (super)-processes are denoted by broken lines; these lines do not represent additional hardware. The memory block 38 comprises an interface circuit 44 which is connected to the local station bus 32. A functional subdivision is shown within the remainder of the memory block 38. Block 62 contains program information (code) exclusively for the process 80; block 64 contains program information exclusively for the process 82, and block 56 contains data (i.e. variable information) which is shared by the processes 80 and 82. Block 50 symbolizes a mail-box function reserved for the relevant superprocess.

The mail-box structure consists of one or more mail-boxes of one or more different types. Each mail-box consists of one or more mail-box locations. Any difference between mail-boxes is defined on the basis of the messages to be accommodated therein, i.e. the amount of information in a message. Each mail-box comprises only locations of a single type. When a memory operation is performed for a (super)process, it is performed by a processor which is at that instant involved in the relevant part of the superprocess, and this processor also provides execution of the instruction, possible modification of the data, and the restorage of the data in a memory location. The memory blocks 62 and 64 are accessible only for read operations by the associated process. The memory block 56 is accessible for read and write operations by both processes 80 and 82. Thus, these processes can communicate via a combination of a write operation by one process, followed by a read operation by the other process in the same memory location of the block 56. Such communication can thus take place via the smallest communication unit in the relevant system, for example a word.

The memory block 50 is accessible for read and write operations by both processes 80 and 82 and, moreover (as the sole part of this memory for which this is the case), for write operations from the bus 32 which are initiated by a superprocess other than the superprocess 74. Thus, these write operations may be initiated by (super) processes located in the same station and also by superprocesses located in another station. The memory attribution is not necessarily as described; for example, the program code may be common to both processes; in any case, the stack registers are each exclusive to the relevant process.

The memory blocks 40 and 42 are similarly organized in order that each accommodates a superprocess consisting of two processes.

The foregoing has been given only by way of example. Superprocesses are always composed of one or more processes; the upper limit in this respect is not imposed by basic but mostly by practical considerations. A station may comprise one or more processors. A station may accommodate one or more superprocesses. The processes of a superprocess need not be assigned to the same processor: the concept of the superprocess notably enables two processes of the same superprocess to be executed simultaneously by different processors of the same station. Moreover, it will be apparent that the situation shown in FIG. 1 is an instantaneous view; after completion of a process or superprocess the relevant information (program code plus data) may, for example, be filed in a background memory.

The stations in the present system may have mutually different architectures. The difference in architecture may concern the components of the stations themselves as well as the (higher) computer language used therein. The stations may also have specific different tasks; notably they may be specialized stations. For example, a given station may control a peripheral apparatus, for example a disc memory. A given station may be assigned to a so-called "work-station", which is the assembly of facilities locally provided for an operator. Within a station, tasks may also be shared by the various processors. The performance of these processors need not be the same either. Examples of suitable processors are the 68000 microprocessor of Motorola Corporation, Phoenix, Ariz., or the microcomputer LSI 11 of Digital Equipment Corporation, Marlborough, Mass. The message format need not be converted within a station.

SOME ASPECTS OF THE FUNCTIONAL SPECIFICATION

The advantages of the distributed system are inter alia its reliability, because the system can remain operative in spite of the failure of given components, its increased capacity, because given specialized components (for example stations or software modules) can be provided for specialized tasks, its extendability, because additional components can be provided in order to increase the capacity, and its increased speed, because different tasks can be performed simultaneously.

The operating system of the processor system separately comprises, in addition to the operating systems of the various stations in so far as they are present, a so-called kernel section and a decentralization section. The kernel section performs the superprocesses.

The kernel section realizes:

a. the translation of a logic mail-box name, as addressed by any superprocess, into a physical address. This takes place each time a job is started, because the situation may have changed at that instant. When this translation has been performed, the physical addresses remain the same except for the cancellation of any other mail-box when the job associated with the latter, and hence also the superprocess, is deactivated. This physical address remains unmodified at least until the job is stopped.

b. the implementation of signalling quantities between various processes for the protection of the communication between the processes. The treatment of signalling bits is known from U.S. Pat. No. 3,997,875. Multivalent signalling quantities are known per se; they have the value range of the non-negative integers on which the known "p" and "v" operations are performed. The "p"

operations tend to decrease the value, while the "v" operations tend to increase the value. The value indicates, for example, the number of processes which are (simultaneously) in the so-called "critical section"; the value range is the permissible upper limit for this number. An associated maximum value is applicable to each signalling quantity. Such signalling quantities can also be used for indicating how full a mail-box is, and also for other purposes. It will be apparent that the p and v operations will have to wait for one another in given circumstances.

c. the implementation of an addressing mechanism for a hardware clock. Such a clock may be provided in all stations (HAMA), but this is not essential; it may alternatively be present in only some of the stations. In the latter case addressing takes place via the communication network; the clock mechanism itself comprises a register which is incremented at an adequate rate, for example with a frequency of 10 kHz. Thus, absolute time (time of day) can be determined by means of the clock mechanism. If resettable, registers are added to the clock mechanism, relative time intervals can also be measured thereby. Such absolute time and relative time intervals can be used for determining delay times for process activation and other "real time" functions.

d. the treatment of external interrupt signals, if any, generated by external functions during the control of peripheral apparatus; such functions are special cases of process generators. The interrupt signals can be generated inter alia in the peripheral apparatus themselves.

Thus, there are three types of processes in a station:

current processes which are active and which are executed while excluding other processes; each processor generally has no more than one current process;

stand-by processes which are also active but which are waiting in a queue for execution;

waiting processes which are not active but which await the fulfillment of an external condition, for example the presence of necessary data or expiration of a period of time.

A fixed priority sequence exists in the queue and no stand-by process may have a priority which is higher than that of the current process. When there are several stand-by processes having the same priority level, the process which has waited longest will be performed first. How long each process has waited is determined by addressing said clock mechanism.

A part of the operating system is formed by a program module for dealing with exceptional conditions such as the occurrence, due to a programming error, of a write operation for a completely filled mail-box space. The module may be arranged to indicate and file the situation causing the exceptional condition and terminate the relevant job. It may also be arranged to subsequently allow for continuation of the program; this means that another process is activated, if possible.

The exceptional condition can be activated by software as well as by hardware.

DESCRIPTION OF JOB CONTROL

The processor system is operative for a user by way of application programs. The interaction between the information streams in the multiprocessor system and the operations outside the system will not be elaborated upon herein. The latter operations may concern the driving of mechanical elements, such as the elements of a robot, conversion into/from analog quantities, the outputting of printed information, and so on. Each application program may be executed in one or more parts of the system simultaneously and each (loaded) component thereof constitutes a job.

A job consists of one or more superprocesses. When generating an application program, a user also forms a description which indicates the resources required. Therefore it is known which stations may be loaded with the superprocesses of the application program concerned. On the basis thereof a distribution file is formed; this file provides a list of distributions of the superprocesses of a job which are acceptable to the user: each element of this file represents one situation which is in principle permissible. Such an element may be, for example, a list of station names; the actual permissibility is then determined by the presence or absence of the relevant stations or the presence or absence of adequate storage space in stations thus assigned. When execution is to take place, first the distribution file is addressed and the elements thereof are tested for actual availability. When a permissible distribution is found, the file of the relevant application program is addressed by the state control system in each station to be used, after which loading is activated by information transports to the relevant stations. Each job thus loaded is provided with a unique and unmodifiable identification. In the present embodiment this identification comprises:

a. identification of the station in which at least one superprocess of the relevant job is loaded, so that the relevant job can always be found again;

b. an instant of time, for example a part of the real time indication.

Thus, the identification of each job is in the form of unique data, and the various jobs can always be addressed by way of their identification, without giving rise to confusion. The loading of an application is controlled by the addressing of the application load file which forms a central part of the operating system.

A job may start another job, the parameters being the application load file which indicates what is to be done, and the distribution file which indicates where this job must be done. A job can address that application of which it itself is a loaded version (component).

A job can address itself.

A job can also address information which indicates (by way of their identifications) which jobs have at least one superprocess in execution in a given station and also, for an identified job, in which stations at least one superprocess of this job is being executed. This is advantageous in respect of interaction between different jobs.

A job is also capable of stopping a job. This may be the relevant job itself; this may occur, for example, when a program error has been made, for example when a write operation is initiated for a completely filled mail-box space. Another example of self-termination is when the relevant job has ultimately been executed so that it has lost its function. A job is furthermore capable of terminating another job which it itself had previously started. Furthermore, upon initiation a job may be assigned a privilege signal by the programmer. When a job is provided with such a privilege signal, it is capable of terminating any arbitrary job. This last may be advantageous, for example, for the control of a robot: When different jobs control different motions and one of the motions is to be stopped, it is necessary to stop all other motions also. Stopping can be selectively performed by the addressing of a job by way of its identification. The job control system furthermore comprises a program module for dealing with disconnections detected by the network control system. The occurrence of a disconnection is detected by the network system to be described hereinafter, for example in that an "OK" signal which is included in every communication procedure is not received at the correct instant or in that a block-wise information transport whose length is known in advance is not completed correctly. This may be due to a station or a connection which fails or which, for example, is physically removed from the system by a user. The job control system then stops all superprocesses of the relevant job within the relevant portion of the system (outside this portion reliable interaction is no longer possible); in special circumstances it executes an intermediate emergency stop operation. A job which executes motion control for a robot may be stopped in such manner that the motion itself is stopped immediately. Thus, in given circumstances a set of superprocesses which do not require communication outside their own portion of the system may continue to be operative for a substantial period of time, but this is not objectionable because it does not give rise to errors.

Figure 4:
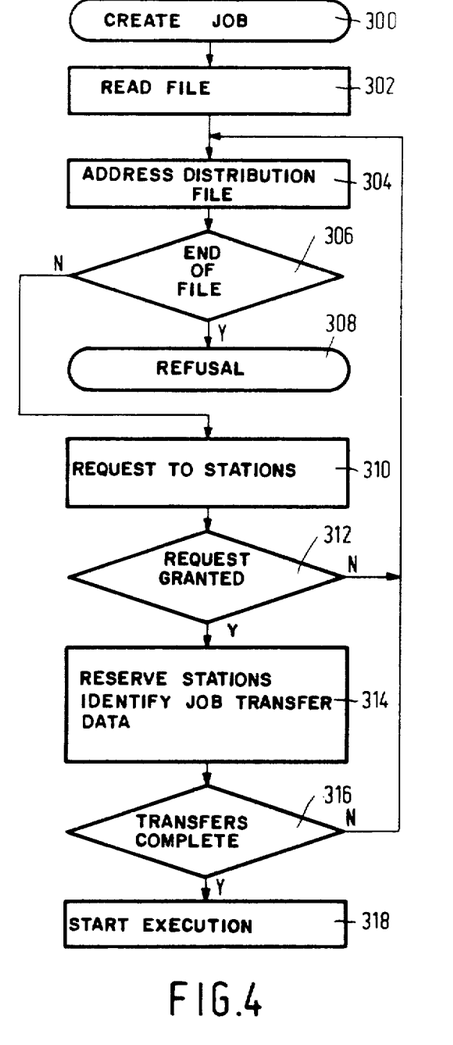
FIG. 4 illustrates the job control aspect of the processor system.

FIG. 4 is a simplified representation of the starting of a job. In block 300 the instruction for the creation of the job is received. In block 302 the file of the application is read. In block 304 the distribution file is addressed. When all elements of this file have been interrogated (test 306) a refusal occurs in block 308. On the basis of the current information from the distribution file, a request is made to each of the stations mentioned in said information in block 310. If any request is refused (test 312) the system proceeds to the block 304. If all requests are granted, in block 314 the relevant stations are reserved as regards the locally present facilities, the identification of the job is formed, and the necessary data transports are performed, for example the transport of the data to be processed. When all information has reached its destination (test 316), the system proceeds to block 318; otherwise it is concluded that the network contains a fault and the system returns to the block 304. In the block 318 the execution of the job is started. The stopping of the job will not be described again in this context.

DESCRIPTION OF THE NETWORK

It is to be noted that the physical properties of the communication network are protected by the interface units such as the element 30 in FIG. 1. Thus, only the logic connection states between the stations need be considered. First block-wise transport via the communication network will be described. The network system controls the routing and the throughput of the transport blocks or transport messages from the source station to the destination station, and also the correction of errors caused by or in the network. In some circumstances the ultimate cause of an error may be an intervention by an operator. Errors are corrected first of all by signalling the occurrence of the error to all stations involved in a given transport. Subsequently, if possible, another attempt is made, for example by utilizing a substitute connection, if such is present.

At the level of the user program there is no difference between the transport within and the transport outside the relevant station. All elementary signal quantities (primitives) of the transport cooperate with the kernel. The control system consists of a number of modules which are located in the various stations in accordance with the configuration of the possibilities for a given station by the designer of the system. This configuration is made in accordance with the general system concepts as described herein.

Figure 2:
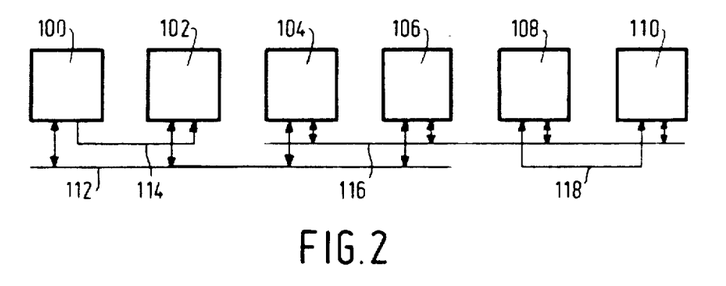
FIG. 2 shows an example of a general communication network.

Each station and each connection has its own name (not to be confused with the names of the mail-boxes which are liable to change each time loading occurs; the present names are constants). FIG. 2 shows a system comprising six stations 100-110 and four connections 112-118. Each of the connections 112 and 116 forms a bus to each of which four stations are connected; connection 114 is a point-to-point unidirectional connection and connection 118 is a point-to-point bidirectional connection. The groups of stations 100/102, 100-106, 104-110 and 108/110 each constitutes a group of neighbors. Two stations which together do not form part of the same group are not neighbors.

The local network control system in a station obtains information concerning all connections to which the relevant station is directly connected. For example, the station 100 has the information concerning the connections 112 and 114. Furthermore, given stations are defined as intermediate stations for the exchange of messages (switching stations), for example by way of a specific portion of their identification. A number of the connections may be defined as "backbone connections", for example again by way of a specific portion of their identification. Backbone connections always extend between intermediate stations. An intermediate station need not be connected to any other intermediate station via a backbone connection. Packets may be transported between non-neighboring stations only via backbone connections. The user can thus restrict the general overhead due to the communication between non-neighboring stations to given connections. The specification as to whether or not a station is an intermediate station is given by the user when the system is designed. This is again done to restrict the overhead due to non-neighbor communication (NNC) to given stations in accordance with the wishes of the user.

For the design of the system the user also specifies a number ($\geq 0$) of pairs of stations which may communicate only via neighbor communication (NC). This is done with the aim of ensuring that communication takes place between these stations only if it is as fast and as efficient as possible. If in such a case the station 104 acts as an intermediate station and the connection 116 is a backbone connection, the station 104 also indirectly has the information on connection 118 at its disposal. The organization of the passing on of the list of stations which can be reached is done by means of two signal quantities "sh(o)wc(o)nf(iguration)" and "sh(o)wnet". These are the calling names of two procedures which can be addressed in each station; the result thereof represents the situation as viewed from the relevant station and is stored in a file for later examination if desired. When addressed, the second quantity presents a list of connections (links): each connection offers a sublist of the stations which can be reached via the connection concerned. The calling of the first name produces a list of all stations which can be reached from the relevant station, i.e. a combination of the sublists presented when the other procedure is called. However, the connection pattern is passed on only by the stations which have been defined as being intermediate stations. The bookkeeping of the accessibility is performed in each station by way of an amount of storage space which has been omitted from FIG. 1 for the sake of simplicity.

A message is dispatched by the communication system as a series of (one or more) packets. The packet is indicated by a header and a data field; for each connection a limit is imposed as regards the length of the data field. A packet to be dispatched by a station is assigned a unique sequence number therein. When a series of packets is successively transported via several connections, the packets may arrive in the same sequence, even when some stations are bypassed, because processing always takes place in a given sequence, for example the generating sequence. This result, however, is not necessarily obtained when different packets are dispatched along at least partly parallel connections. For each sequence number it is recorded in the source station whether or not the associated packet has been "dealt with". "Dealt with" is to be understood to mean herein that the packet has been dispatched and that the transmitter process has been notified of the fact that either.

the packet has correctly arrived or something may have gone wrong; in both cases the sequence number of the packet concerned is returned to the network control system of the source station.

The number of packets allowed to travel simultaneously between the source station and the destination station is subject to a maximum which is specified by the user in order to restrict the sequence number bookkeeping system to a maximum value and to enable the returned sequence numbers to be used again. This technique is generally referred to as a "sliding window protocol".

DETAILED DESCRIPTION OF A STATION

Figure 3:
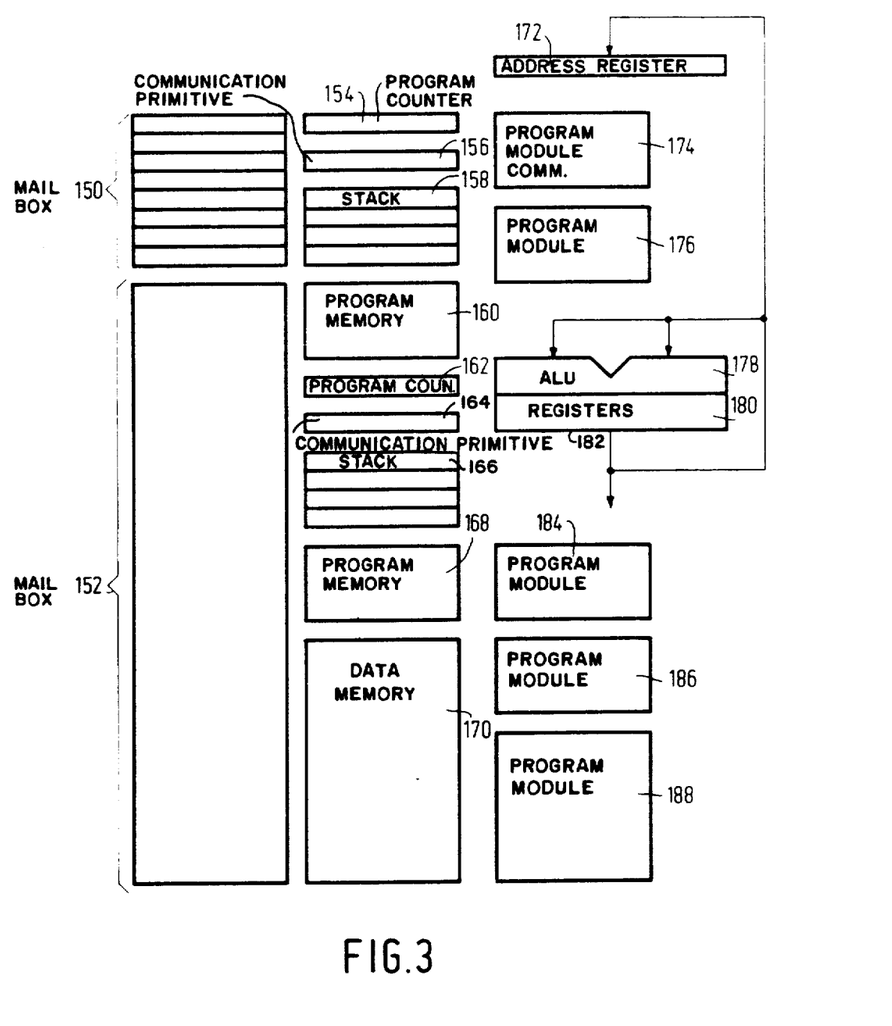
FIG. 3 is a block diagram of a single station.

FIG. 3 is a detailed block diagram of a station. It comprises a processor which may be of a kind which is known per se; only an ALU unit 178, an internal register bank 180, a feedback connection and an address register 172, interconnected by a data path, are shown.

The station contains a superprocess consisting of two processes; it also contains two mail-boxes provided for the said superprocess. Mail-box 150 is capable of containing eight items each consisting, for example, of one or a few words. Mail-box 152 is capable of containing one item which comprises many words, for example representing a page of a document. The mail-boxes have a logic name and in this case a physical address which consists, for example, of a concatenation of the station address and the relative addresses of the first word locations of the section of memory in which the mail-boxes are located. Furthermore, for the mail-box 150 there are provided a read pointer and a write pointer, so that the mail-box is organized as a FIFO memory in known manner. An address recognition element which is connected to the communication network recognizes whether the addresses received indeed correspond to one of the mail-boxes; if so, the information is written into the relevant part of the memory, subject to the condition that the mail-box has not yet been filled. For the mail-box 152, a DMA mechanism is implemented in known manner in such circumstances. For the first process there are provided a location 154 which acts as a program counter, a location 156 which serves for the storage of communication primitives, a register stack 158 which comprises four locations, and a non-private program code memory 160. For the second process the configuration in the locations 162-168 is similar; in this case, however, the program code memory is private, i.e. is accessible only to this process. Furthermore, for one of the two processes there is provided a non-private data memory 170. Whether or not a memory is private is indicated by a "private" bit and a list of processes which are qualified for access. Consequently, these processes must be verified for access. This can be done in the manner customarily used for a segmented memory organization where the address displacement may not exceed an upper limit. A program module 174 contains the communication primitives for the network traffic with other stations, and a program module 176 contains a program for the recognition of input blocks which have been generated in an architecture environment which is different to that of the relevant station. Program module 184 contains a program for loading an external process into the relevant station; program module 186 contains a program for the treatment of an exceptional situation, and program module 188 contains a program for the execution of the necessary job control and file management. The clock is addressed by way of a block which is small enough to fit into the mail-box 150.

DESCRIPTION OF THE KERNEL SYSTEM

A description will now be given of the part of the operating system which enables the processor system to operate as a multi-station system and which is present in every station. These kernels can be addressed by user processes in the relevant station itself and also by operating system processes from other stations. The superprocesses are implemented via the kernel. The kernel also controls the interaction between the relevant processes and the system.

The kernel offers the following protection against inadmissible access between different program activities in the system:

a process may not address the stack of another process;

a superprocess may not address the local data of another superprocess;

a job may not dispatch messages to mail-boxes of superprocesses which belong to jobs of another user program.

Each mail-box has an identifier "boxid" and can be provided with a type identifier which uniquely identifies the type of message which can be received. Each mail-box comprises a predetermined number of sections, each of which is capable of containing one message. The situation in the mail-box is characterized by three variables A, B and C, that is to say the "transmitted sequence", the "received set", and the "deleted set". The first variable A is used to keep a count of all messages dispatched to the relevant mail-box by another station. The second variable B is used to keep a count of all messages received in the associated station from the relevant mail-box. The third variable C is used to keep a count of all messages which have been deleted in the relevant mail-box. Consequently, (A-C) at the most equals the number of sections of the mail-box. If A=C the mail box is full.

When a message is dispatched via the communication network, it is necessary to specify the processor architecture and the computer language of the station of the transmitting superprocess. If one of the two deviates from the corresponding characteristic of the station of the receiving superprocess, a conversion procedure is activated at the end of reception. This procedure is executed within the addressed (destination) process, the starting material being the information received in the relevant mail-box.

The state of the processes in a station may be changed by an interrupt signal or by a synchronization function. A waiting process can be activated when a condition is satisfied; a current process may enter the waiting state when a condition has to be satisfied for further completion, or another current process is substituted therefore, but remain ready for further execution. The following rules are implemented:

there is no stand-by process having a priority which is higher than that of the current process;

when a selection is to be made between two stand-by processes, the process which has waited longest has priority; this increases the predictability for a user as to how the system will perform;

the number of changes between processes is minimized.

The processes within a superprocess are synchronized by common variables, for example signalling bits. The well known "p" and "v" operations are performed on the signalling variables.

Figure 5:
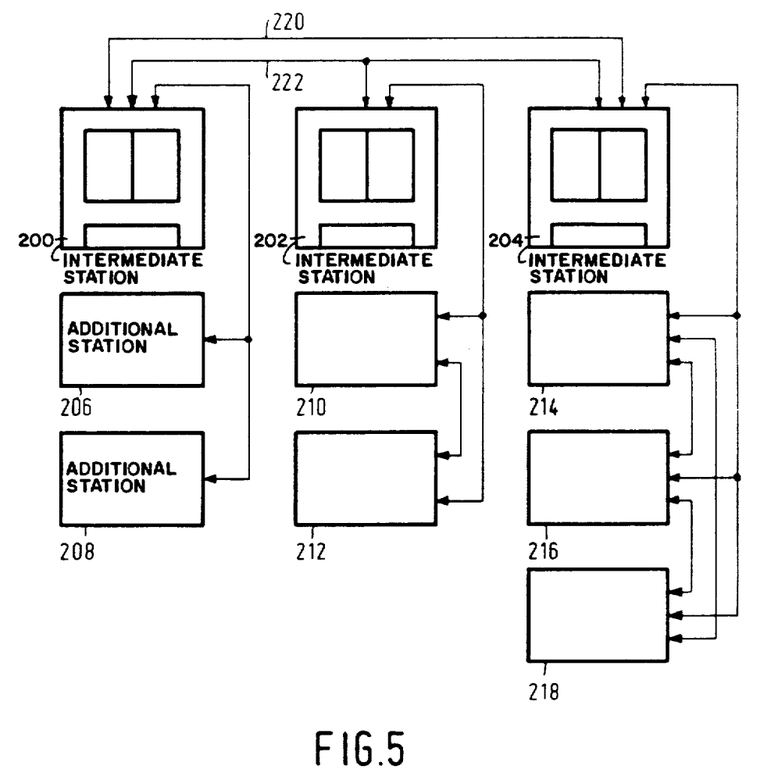
FIG. 5 illustrates the network control aspect of the processor system.

FIG. 5 illustrates the network control system of the multiprocessor system on the basis of a network configuration. The stations are subdivided into two categories. First of all there are intermediate stations 200, 202, 204. Also provided are further stations 206 to 218. Together with their interconnections, the intermediate stations form the core of the system. These stations make possible communication between stations which are not directly connected, for example the stations 208 and 218. As is indicated, intermediate stations are often provided with multiple interconnections such as the connections 220 and 222. The other stations can only communicate with the stations to which they are directly connected as neighboring stations and with one or more intermediate stations to make it possible for them to reach another non-intermediate station via an intermediate station.

When the system is initialized, first the structure is defined; each station is entered on a list with all direct connections and also the stations which can be directly reached via these direct connections. This is performed by way of a question and reply procedure during which the connections are successively interrogated; when an identifying reply is received, a presence indication for the connection-cum-station-identification is stored. During operation of the system, a connection may fail, for example the direct connection 220 between the stations 200 and 204. However, the network topology is not changed thereby so that the failure need not be made known to the other stations. It will be apparent that a network change can thus be quickly and simply implemented. Notably the user does not know the internal structure of the network in as far as its direct adaptation is not concerned.

All non-intermediate stations are directly connected to one of the intermediate stations. As has already been stated, two neighboring stations or the relevant superprocesses in two neighboring stations can communicate with the mail-box mechanisms previously described. Two non-neighboring stations can communicate only by utilizing at least one intermediate station. Communication takes place in the form of information packets. Such a packet always comprises a header. This header contains information as regards the route to be followed.

The transport is effected as follows. Each non-intermediate station outside the backbone structure is provided, within each intermediate station to which it is directly connected, with a so-called forwarding buffer which is not accessible to other non-intermediate stations. The capacity of the buffer amounts to one or more packets as chosen by the designer of the system. The dispatch of information to such a forwarding buffer, therefore, takes place on the basis of packets until the buffer is full as indicated by a filling indicator which can be addressed by the relevant station. In any other intermediate station to which it is connected, each intermediate station is provided with a so-called remote buffer. These remote buffers are also statically allocated to an associated intermediate station for as long as the connection exists physically. The remote buffers are controlled by the station to which they are allocated and have a capacity defined by the designer of the system; they are also provided with an addressable filling indicator. Each remote buffer is connected to a logic detection circuit for decoding the control information contained in the control header. The latter information comprises:

an identifier concerning the source station;

an identifier concerning the destination station;

an indication of the route which is to be followed and which is valid in first instance (when this path is interrupted, but another path is available, the latter path is activated as a substitute);

an identifier concerning the content of the packet, such as a name, a sequence number;

a priority indication, and possibly other indications.

In an intermediate station the path to be followed by a packet is detected and adhered to should the packet be in a forwarding buffer or in a remote buffer. A more extensive detection strategy is implemented for a packet in a remote buffer than for one in a forwarding buffer: the priority between different source stations is taken into account; for one and the same source station the packets are dispatched in accordance with their sequence number, so that in the vast majority of cases the sequence of the packets at the destination station will be the same as that used for the dispatch by the source station. As a result of this static implementation of different buffer categories, the response of the network to a request is accelerated, be it at the expense of additional storage space which could otherwise have been used as a buffer space (for example organized as FIFO) for bulk data transports and thus have resulted in a higher throughput speed.

A further detail of the network control system is the so-called "time out" mechanism which is the waiting time which is implemented before an anticipated occurrence is deemed to be missing. This is because it is often impossible to predict exactly at which instant a second station will respond to a request from a first station. Moreover, it has been found that the statistical distribution of the instants of reply is a very lopsided (for example Poisson) distribution.

The aim is to minimize the lengths of such waiting periods without a large number of replies being falsely classified as being "too late". Therefore, the time-out mechanism is exclusively locally implemented, which means that only replies are awaited which are to be generated by a directly neighboring station. This implies that a transfer may fail in a later stage, without this failure being detected immediately by the station acting as the requester in an earlier stage. Consequently, waiting is reduced and the response to the next request signal is accelerated, for example when a series of packets are dispatched.

Therefore, the characteristic features of the network control system are:

a. all buffers are statically preallocated to an associated station;

b. the packets contain a built-in routing indication;

c. the time-out mechanism concerns only local communication between two stations.

DESCRIPTION OF THE FILE CONTROL SYSTEM FOR PERIPHERAL APPARATUS

A system of the kind described will usually also comprise one or more peripheral apparatus. Examples of such apparatus are a background memory, a keyboard, a line printer, a display unit (for example using a CRT), a connection to an external processor system or a robot, all apparatus being provided with relevant control units. All peripheral apparatus are treated as "files". In this respect the system forms an extension of the UNIX system which is generally known and which will not be elaborated upon herein. The extension concerns inter alia the use of several processors. Each station is provided with a peripheral apparatus table which is stored in the local memory and which thus indicates (by name and number) the peripheral apparatus which are accessible to the relevant station. These apparatus may be local peripheral apparatus as well as peripheral apparatus which are physically linked to another station. The peripheral apparatus linked to the various stations, therefore, need not be accessible to mutually identical sets of peripheral apparatus. Communication with the various peripheral apparatus takes place on the basis of the mail-box organization previously described: each peripheral apparatus is characterized as a process or, in given circumstances, as a superprocess. The files may have a variety of sizes and organizations. For a matrix printer, for example, the file size equals the content of the line buffer for one or more lines to be printed, and only write operations are relevant. For a disc memory the file is usually organized as an index of contents or table. The elements of the table are either the actual files in which in principal write or read operations are permissible, or one or more subaltern indices. When a file is opened, a file descriptor is generated. Write operations in and read operations from the file are performed via the file descriptor instead of via the file name. This offers the gain in speed which is already known from said UNIX system. The file descriptor consists of a string of identification elements whereby the path through the hierarchy is given. The following facilities are provided for the files:

a. In view of the addressing and protection of the files there is first of all provided a "lock" option. This option can be activated when an existing file is opened. The relevant file is then privileged for the process which has generated the "open" instruction. Subsequently, the relevant process has the information or storage capacity of the relevant file at its disposal to the exclusion of any other process. When it no longer needs it the relevant process can close the open file again, thus cancelling the "lock". When a file is closed, the identification thereof is no longer used by the relevant process. A file can also be opened without the "lock" option; the file is then accessible to all other processes, at least in as far as the relevant processes already have access to the file as determined by the file control system.

b. Less exclusive privileging is achieved by way of a "claim" mechanism. First the file is opened, after which access to the file is claimed by means of the file descriptor. This is particularly suitable for cooperating processes. When two processes address the same file, the process which makes a claim first is successful and the process claiming at a later instant is delayed. When the first process has finished its addressing operation the later claiming process is activated in order to perform its own access operation. Any input/output operation by a station other than the station making the claim is prevented.

The file control system also comprises means for addressing an external computer system. This can be done in the same way as in the UNIX system mentioned and also in accordance with the known VMS system. The activation of an external computer system involves a difference only in that the type of file window is different. The file window has a prefix which indicates which device is concerned, for example an external computer system. Furthermore, all system primitives are mapped on those of the external computer system; they correspond to those of the UNIX system. When a message generated by the external computer system is filed (said message being preceded by a series of bytes), the bytes are not interpreted by the local file control system: such an external access is passed on to a relevant peripheral apparatus (device).

Finally, there is provided a mechanism for communication between different jobs, the so-called pipe transports. Such a pipe transport acts as a virtual file which is accessible for reading and writing. Physically, it acts as a buffer. When a first job wishes to write to a second job, first the "pipe" is opened. When the second job also addresses this "pipe", further transport is possible. The pipe buffer is located in a suitable amount of memory space.

What is claimed is:

1. A data processing system having a plurality of stations, each of said stations having local resources including at least one local data processor and a local memory that is accessible to any local data processor of said station but unreadable to any other data processor, said stations being interconnected by a general communications network, said system having:

receiving means for receiving a user application program that specifies a set of resources required for executing said application program;

job control means, for dynamic assignment of jobs making up said application program fed by said receiving means for loading, under conditional enabling by a signal indicating the availability of resources in said plurality of stations, at least a component of said application program into a subset of said plurality of stations as at least one job, each job accommodating at least one superprocess, wherein said superprocess is a number of processes each having a number of elements and operations performed sequentially on the same data, while allocating each superprocess to a single station of said plurality of stations, said job control means further having job starting means and job stopping means;

kernel means in each of said stations fed by said job control means for receiving superprocess allocation information and also said kernel means in a first station being addressable by a user process in said first station and by at least one operating system process in a second station, said kernel means controlling interprocess interaction, having:

enabling means for enabling within a particular superprocess all processes thereof to access commonly variable information including at least data present in said local memory; privilege means for providing access to each process within a superprocess a private memory stack within said local memory;

mailbox control means for assigning to each superprocess a mailbox within said local memory, said mailbox writable by any superprocess within said system, but readable exclusively to its own assigned superprocess each superprocess comprising writing means for writing block-wise information in a selected mailbox space assigned to any superprocess, each mailbox having a filing degree indicator with control means for generating, under control of a read operation by a superprocess in its own mailbox, a wait signal for this process; for signalling, under control of a write operation by a superprocess, a full mailbox; said job control means having means to stop an attempt to write into a full mailbox, but to otherwise enable a read or write operation by a superprocess to take place.

2. A processor system as claimed in claim 1, characterized in that at least one station comprises a plurality of processors, the architecture of said processors in each specific station which comprises more than one processor being the same.

3. A processor system as claimed in claim 1 or 2, characterized in that all processors have a similar architecture, each station including an input element and an output element for communicating a message via said general communication network in the same information format as that used within said stations.

4. A processor system as claimed in claim 1, in which at least two different processor architectures are present, characterized in that each station includes an output element for communicating a message via said general communication network in the same format as that used in said station, and an input element for converting, if necessary, a message received into a format compatible with a processor of said station.

5. A processor system as claimed in either claims 1 or 2, characterized in that said job control means is such that a set of stations to which a job is assigned remains the same until termination of said job.

6. A processor system as claimed in claims 1 or 2, characterized in that each superprocess comprises addressing means for addressing clock means which are included in said processor system in order to indicate real time and relative time.

* * * * *